WHEELED VEHICLE
Filed Dec. 19, 1958 2 Sheets-Sheet 1
FIG. 1.
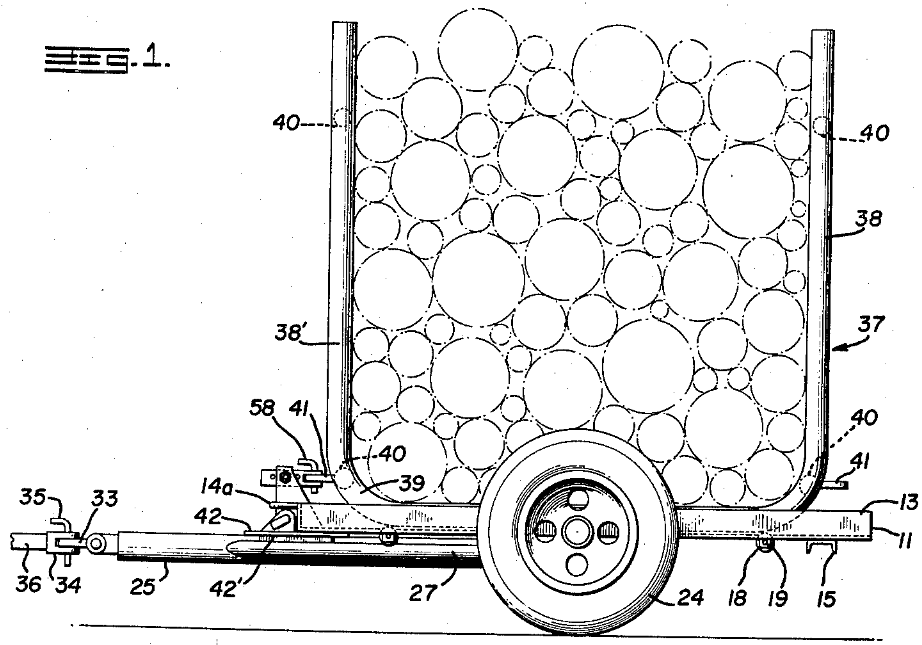
FIG. 2.
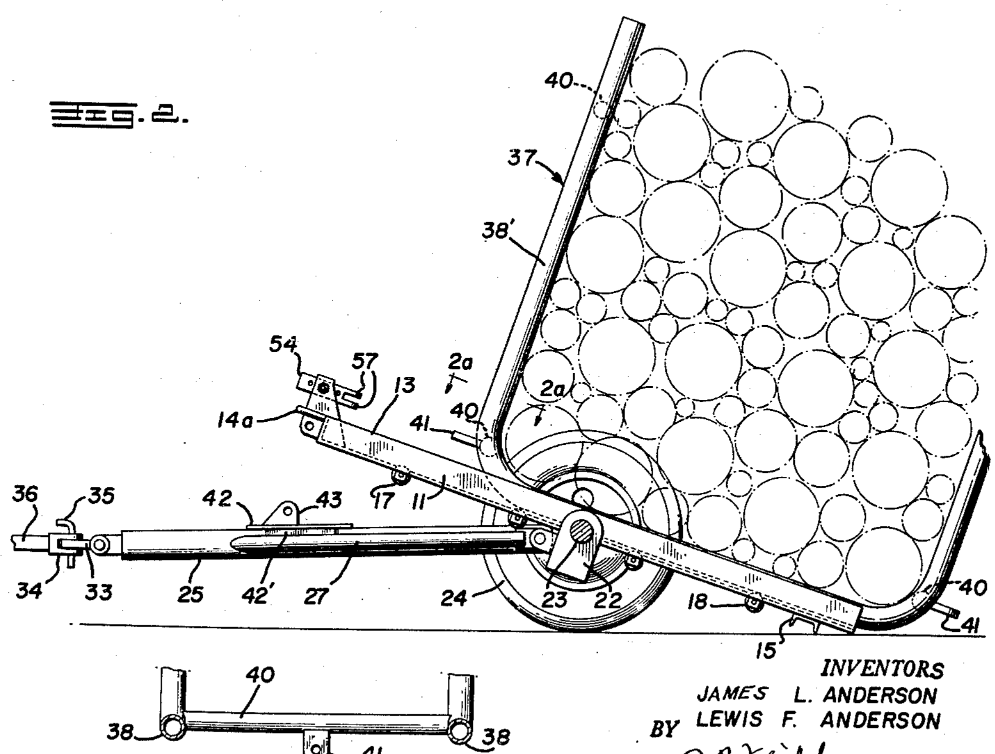
40
38 38
41
FIG. 2A.
INVENTORS
JAMES L. ANDERSON
LEWIS F. ANDERSON
BY B P Fishburne
ATTORNEY WHEELED VEHICLE
Filed Dec. 19, 1958
2 Sheets-Sheet 2
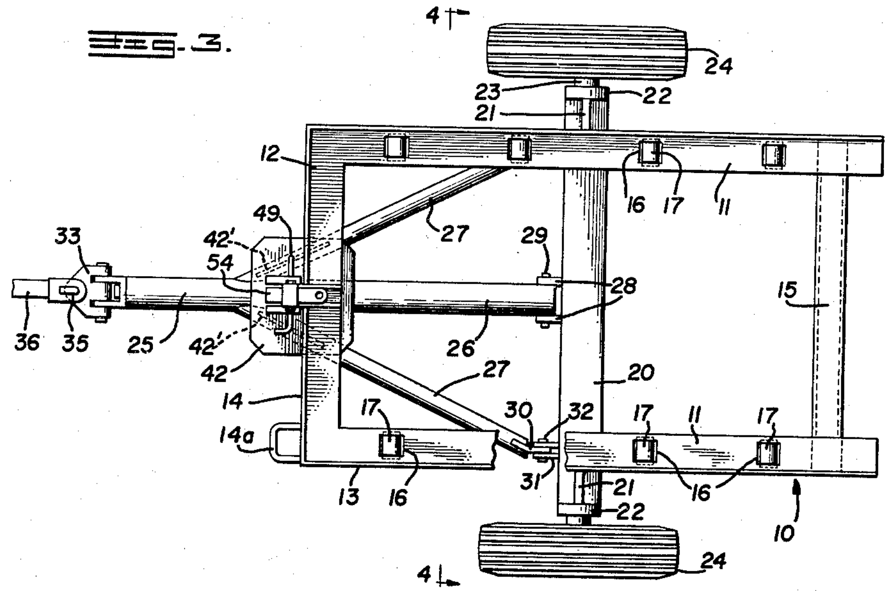
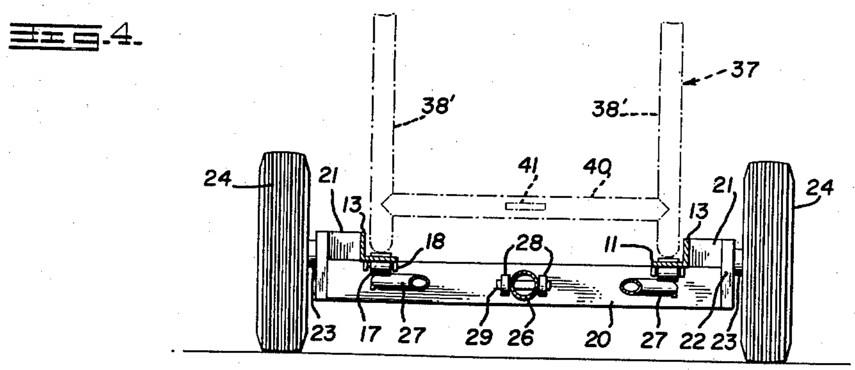
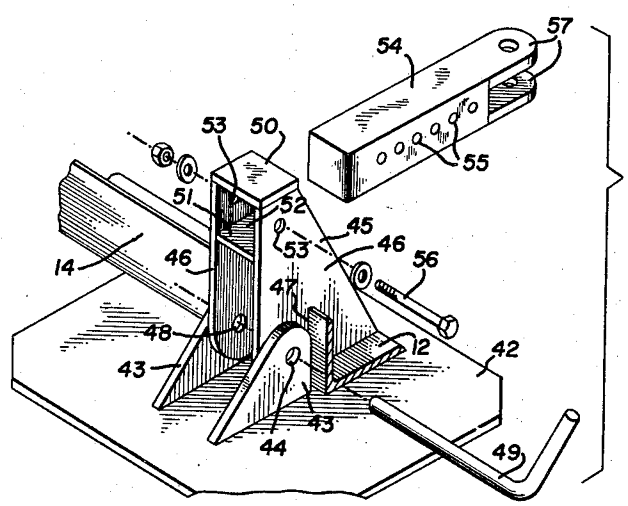
FIG. 5.
INVENTORS
JAMES L. ANDERSON
LEWIS F. ANDERSON
BY B. P. Fishburne
ATTORNEY United States Patent Office 2,925,186

Patented Feb. 16, 1960

2,925,186

WHEELED VEHICLE

James L. Anderson and Lewis F. Anderson, Camden, S.C.

Application December 19, 1958, Serial No. 781,597

1 Claim. (Cl. 214—506)

The present invention relates to a wheeled vehicle or cart for manipulating and transporting a pallet or container holding wood or small logs.

An important object of the invention is to provide apparatus of the above-mentioned character of simplified construction and which can be manipulated by a single operator.

A further object of the invention is to provide adjustable means for holding the pallet or the like in a selected position upon the vehicle or cart so that the center of gravity of the load will be slightly in advance of the axle of the cart.

Other objects and advantages of the invention will be apparent during the course of the following description.

In the accompanying drawings, forming a part of this application and in which like numerals are employed to designate like parts throughout the same, Figure 1 is a side elevation of a vehicle or cart embodying the invention, showing the bed-frame in the horizontal or closed position, Figure 2 is a similar view, showing the bed-frame inclined, Figure 3 is a plan view of the vehicle or cart with the pallet removed, Figure 4 is a transverse section taken on line 4—4 of Figure 3, Figure 5 is an exploded perspective view of the attaching bracket and adjustable coupling, Figure 2*a* is a plan view of the front horizontal bar of the pallet and apertured ear, taken on line 2*a*—2*a* of Figure 2.

In the drawings, where for the purpose of illustration is shown a preferred embodiment of our invention, the numeral 10 designates a bed-frame which may be rectangular and includes longitudinal sides 11 and a front transverse end 12. The elements 11 and 12 are shown as L-shaped in cross section, providing up standing flanges 13 and 14. We contemplate making the sides 11 and ends 12 U-shaped in cross section or they may be made entirely flat. The rear ends of the sides 11 are rigidly connected by a transverse bar 15, as shown. The sides 11 are provided with openings 16, which are longitudinally spaced, and these openings receive the upper portions of rollers 17, which project slightly above the sides 11, as shown. While the rollers 17 are shown as cylindrical, we contemplate forming these rollers with grooved peripheries for guiding the pallet, to be described. We may also equip the rollers with flanges at their ends. When the rollers serve to guide the pallet, the flanges 13 may be omitted. The rollers 17 are arranged between depending ears 18, rigidly mounted upon the sides 11, and the rollers are rotatably mounted upon these ears by pins 19 or the like.

The bed-frame 10 has its sides 11 extending over an axle 20, arranged substantially at the longitudinal center of the bed-frame. The sides 11 are rigidly secured to the axle 20 by welding or any suitable means, and the flanges 13 may be welded to upstanding plates or gussets 21, rigidly secured to the axle 20, and preferably formed integral therewith. Extending above the axle 20 are upstanding cranks 22, rigidly secured to the axle 20 and gussets 21. These cranks carry spindles 23, upon which wheels 24 are rotatably mounted.

The vehicle or cart comprises a tongue-frame 25, including a tongue 26, and diagonal braces 27, rigidly secured to this tongue. The rear end of the tongue 26 is pivotally secured to ears 28, by means of a pin 29, and these ears are rigidly mounted upon the axle 20 at its longitudinal center. The diagonal braces 27 are provided at their rear ends with ears 30, rigidly secured thereto, and the ears 30 are arranged between pairs of ears 31, rigidly secured to the axle 20 inwardly of and near its ends, by means of pins 32. It is thus apparent that the tongue-frame 25 is pivotally connected with the axle 20 so that the axle may readily turn upon its longitudinal axis with respect to the tongue-frame.

Pivotally connected with the forward end of the tongue 26 is a coupling 33, to be arranged between companion couplings 34 and detachably connected therewith by a pin 35. The coupling 34 is secured to a drawbar 36, which is secured to the rear of a tractor or the like.

The numeral 37 designates a pallet or frame for holding the load, which may consist of small logs or wood, such as is used in the paper making industry. This pallet or frame comprises a pair of spaced U-shaped frame members 38, including upstanding sides and horizontal bottoms 39. The forward and rear upstanding sides 38' of the U-shaped frame members are rigidly connected by horizontal bars 40. The lower bars 40 have apertured couplings 41 rigidly secured thereto. The couplings 41 are arranged near and at an elevation above the horizontal bottoms 39, as shown.

The numeral 42 designates an attaching plate, arranged adjacent to the tongue 26 and the forward ends of the diagonal braces 27 and this attaching plate is rigidly mounted upon the tongue 26 and diagonal braces by any suitable means, such as by welding. Ribs 42' are disposed between the plate 42 and the bars 27. The forward end 12 of the bed-frame rests upon the attaching plate 42, when the bed-frame is in the horizontal position, Figure 5.

Rigidly mounted upon the attaching plate 42 and extending above the same, Figure 5, are vertical ears 43, which are spaced, and are provided with horizontal openings 44. A bracket 45 is rigidly mounted upon the front frame end 12, and includes vertical sides 46. These sides have notches 47 formed therein, to receive the vertical flange 14 of the front end 12, as shown. The sides 46 are also rigidly secured to the flange 14. The sides 46 are arranged to be moved between the ears 43 and these sides have horizontal openings 48, to register with the openings 44 and to receive a removable coupling pin 49. The bracket 45 also includes horizontal webs 50 and 51, rigidly secured to the sides 46, and forming with the sides a horizontal socket 52. The sides 46 have horizontal openings 53 which lead into the socket 52.

The numeral 54 designates a tubular coupling, which may be square in cross section. This tubular coupling has sides provided with longitudinal rows of horizontal openings 55, for receiving a removable coupling pin 56. The coupling 54 is longitudinally adjustably mounted upon the bracket 45 within the socket 52. The tubular coupling is provided at its rear end with horizontal ears 57, for receiving a removable coupling pin 58, adapted to be inserted within the aperture of the ear 41 at the front of the pallet.

The operation of the apparatus is as follows:

The load including the wood or logs is introduced into the pallet, manually or by any conventional means, and the horizontal bottom of the pallet may then rest upon the ground. The loaded pallet is then mounted upon the bed-frame and to do this the bed-frame is arranged in the inclined position, as shown in Figure 2. The loaded pallet is now moved longitudinally of the bed-frame in a forward direction, and the bottoms 39 will travel over the rollers 17. When the pallet has reached the forwardmost position with respect to the bed-frame, Figure 1, the ear or coupling 41 will enter the space between the ears 57 of the coupling 54 and the forward ear 41 will then be locked to the coupling 54. The coupling 54 is previously longitudinally adjusted with respect to the bed-frame so that the center of gravity of the loaded pallet will be slightly in advance of the axles 23 and the bed-frame will automatically move to the horizontal position. When this occurs, the bracket 45 will have its sides 46 arranged between the vertical ears 43 and these parts will be connected by the coupling pin 49.

When it is desired to remove the pallet from the bed-frame, the bracket 45 is released from the ears 43 by removing the coupling pin 49. The bed-frame 10 may then be horizontally inclined by raising the forward end of the bed-frame by engagement with the handle **14*a*, rigidly secured to flange 14. When the bed-frame is held inclined, the coupling pin 58 is removed and the ear or coupling 41 is disengaged from the coupling 54, and the pallet will then move downwardly toward the lower end of the inclined bed-frame. When the vehicle or cart is moved forwardly slightly, the pallet will move from the bed-frame and again be positioned upon the ground. The apertured ears or couplings 41 may be engaged by any suitable means, manually or power-operated, for the further handling of the loaded pallet. The loaded pallet may be completely moved upon the inclined bed-frame by manual manipulation or by power-operated elements attached to the front or back ears or couplings 41**.

When the ground is soggy, it would be diffcult to move the pallet when loaded from position upon the ground to the forward or locked position on the bed-frame 10. Under these circumstances, the empty pallet is applied to the bed-frame and locked in the forward position upon the bed-frame by connecting the ear 41 with the ears 57 by the pin 58. The bed-frame is then locked in the horizontal position to the tongue-frame 25, by passing the pin 49 through the apertures 44 and 48. The tongue-frame is now secured to the tractor drawbar 36 and the empty pallet mounted horizontally upon the bed-frame and tongue-frame is transported by the tractor to the desired loading position, and the empty pallet is now loaded with the wood or logs. The tractor now moves the loaded pallet to the unloading position which may be at the highway, and the bed-frame is then inclined, Figure 2, and the loaded pallet deposited on the ground, and is then transferred to a truck or the like for final transportation.

It is thus seen that the pallet may be locked in the forward position on the bed-frame 10, when the pallet is filled with the load or when empty.

It is to be understood that the form of our invention herewith shown and described is to be taken as a preferred example of the same, and that various changes in the shape, size and arrangement of parts may be resorted to, without departing from the spirit of the invention or the scope of the subjoined claim.

Having thus described our invention, we claim:

Apparatus for transporting wood or small logs, comprising a bed-frame, a transverse axle arranged near the longitudinal center of the bed-frame and secured to the bed-frame, wheels carried by the axle, a tongue device extending beneath the bed-frame and pivotally connected with the axle, the bed-frame overlapping the tongue device, an upstanding bracket rigidly secured to the forward end of the bed-frame and including a generally horizontal socket, said bracket having its lower portion projecting forwardly beyond the bed-frame, a pair of upstanding ears rigidly mounted upon the tongue device forwardly of the bed-frame and receiving the projecting portion of the bracket between them, means detachably connecting the projecting portion of the bracket and the ears, a generally horizontal coupling mounted within the socket, means adjustably connecting the coupling with the bracket so that the coupling may be horizontally adjusted and locked in the selected horizontal adjusted position with respect to the bracket, a pallet for movement upon the bed-frame, an element secured to the forward side of the pallet, and means detachably connecting the last-named element with the coupling.

References Cited in the file of this patent

UNITED STATES PATENTS

| | | |
|---|---|---|
| 2,408,862 | Lisota | Oct. 8, 1946 |
| 2,650,730 | Rohm | Sept. 1, 1953 |
| 2,711,259 | Jones | June 21, 1955 |
| 2,867,339 | Nelson | Jan. 6, 1959 |